UNITED STATES PATENT OFFICE.

ANDERS LARSEN, OF TERRACE, UTAH TERRITORY.

COMPOSITION FOR SUPPOSITORIES.

SPECIFICATION forming part of Letters Patent No. 273,552, dated March 6, 1883.

Application filed August 19, 1882. (No specimens.)

*To all whom it may concern:*

Be it known that I, ANDERS LARSEN, of Terrace, in the county of Box Elder and Territory of Utah, have invented a new and useful Improvement in Compounds for Forming Suppositories, of which the following is a full, clear, and exact description.

For this purpose I use tallow, one hundred parts; camphor gum, fifteen parts; alum, five parts; bitter aloes, one part. The camphor gum and alum are first pulverized, then mixed with the tallow and aloes, all then heated until the tallow is melted, and the ingredients thoroughly intermixed by stirring. The mixture is then poured into molds and given the desired roll form, with a projection from the outer end. During the warm season a little wax may be added to the mixture to give it the desired consistency.

Having thus described all that is necessary to a full understanding of the invention, what I claim as new is—

A suppository consisting of tallow, camphor-gum, alum, and bitter aloes in about the proportions specified.

ANDERS LARSEN.

Witnesses:
   A. W. DRURY,
   WM. TAYLOR, Jr.